US010244781B2

(12) United States Patent
Cantrell et al.

(10) Patent No.: US 10,244,781 B2
(45) Date of Patent: Apr. 2, 2019

(54) REFRIGERATED BLANKET FOR COLD PRODUCT TRANSPORT

(71) Applicant: Walmart Apollo, LLC, Bentonville, AR (US)

(72) Inventors: Robert Cantrell, Herdon, VA (US); Michael Dean Atchley, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/883,344

(22) Filed: Jan. 30, 2018

(65) Prior Publication Data

US 2018/0249738 A1    Sep. 6, 2018

Related U.S. Application Data

(60) Provisional application No. 62/465,499, filed on Mar. 1, 2017.

(51) Int. Cl.
| | | |
|---|---|---|
| *A23L 3/36* | (2006.01) |
| *A47G 9/02* | (2006.01) |
| *B32B 3/20* | (2006.01) |
| *B32B 5/02* | (2006.01) |
| *F25B 41/00* | (2006.01) |

(52) U.S. Cl.
CPC .............. *A23L 3/36* (2013.01); *A47G 9/0215* (2013.01); *B32B 3/20* (2013.01); *B32B 5/022* (2013.01); *F25B 41/003* (2013.01); *B32B 2307/102* (2013.01); *F25B 2300/00* (2013.01)

(58) Field of Classification Search
CPC ................. A47G 9/0215; A61F 7/0097; A61F 2007/0054; A61F 2007/0056; A41D 13/0053
See application file for complete search history.

(56) References Cited

U.S. PATENT DOCUMENTS

| | | | | |
|---|---|---|---|---|
| 2,093,834 A | * | 9/1937 | Gaugler | A41D 13/0053 126/204 |
| 2,110,022 A | * | 3/1938 | Kliesrath | A47G 9/0215 126/204 |
| 2,250,325 A | * | 7/1941 | Barnes | A47G 9/0215 126/204 |
| 2,504,308 A | * | 4/1950 | Donkle, Jr. | A47G 9/0215 165/46 |
| 2,978,225 A | * | 4/1961 | Gordon, Jr. | A47G 9/0215 137/614.04 |

(Continued)

FOREIGN PATENT DOCUMENTS

CN    202077984 U    12/2011

*Primary Examiner* — Cassey D Bauer
(74) *Attorney, Agent, or Firm* — McCarter & English, LLP; David R. Burns

(57) ABSTRACT

Exemplary embodiments provide a flexible cooling blanket including a cooling layer assembly and a heat dissipating layer assembly. The cooling layer assembly includes a first set of rigid cooling coils connected to a second set of rigid cooling coils using a first flexible tube. The heat dissipating layer assembly includes a first set of rigid heat dissipating coils and a second set of rigid heat dissipating coils connected with a second flexible tube. The first and second flexible tubes extend across the folding seams of the blanket.

21 Claims, 6 Drawing Sheets

(56) References Cited

U.S. PATENT DOCUMENTS

| | | | | |
|---|---|---|---|---|
| 3,154,926 A * | 11/1964 | Hirschhorn | A47G 9/0215 | 165/172 |
| 3,242,979 A * | 3/1966 | Shlosinger | A41D 13/0053 | 165/46 |
| 4,118,946 A * | 10/1978 | Tubin | A41D 13/0053 | 126/204 |
| 4,132,262 A * | 1/1979 | Wibell | A47G 9/0215 | 165/206 |
| 4,738,119 A * | 4/1988 | Zafred | A41D 13/0053 | 2/81 |
| 4,777,802 A * | 10/1988 | Feher | A47G 9/0215 | 5/423 |
| 4,959,877 A * | 10/1990 | Covil | A47C 21/044 | 5/423 |
| 4,998,415 A * | 3/1991 | Larsen | A41D 13/0053 | 62/231 |
| 5,165,127 A * | 11/1992 | Nicholson | A47G 9/0215 | 165/46 |
| 5,167,227 A * | 12/1992 | Meserlian | A61D 9/00 | 601/151 |
| 5,269,369 A * | 12/1993 | Faghri | A41D 13/0056 | 165/104.14 |
| 5,320,164 A * | 6/1994 | Szczesuil | A41D 13/005 | 165/46 |
| 5,470,353 A * | 11/1995 | Jensen | A61F 7/0097 | 607/104 |
| 6,109,338 A * | 8/2000 | Butzer | A41D 13/005 | 165/46 |
| 6,168,612 B1 * | 1/2001 | Augustine | A47G 9/0215 | 601/16 |
| 6,418,973 B1 | 7/2002 | Cox et al. | | |
| 6,957,697 B2 * | 10/2005 | Chambers | A41D 13/005 | 165/297 |
| 9,044,371 B2 * | 6/2015 | Richardson | A61G 17/002 | |
| 9,492,314 B2 * | 11/2016 | Richardson | A61F 7/02 | |
| 9,615,967 B2 * | 4/2017 | Lowe | A61H 9/0021 | |
| 2002/0100121 A1 * | 8/2002 | Kocurek | A47G 9/0215 | 5/482 |
| 2006/0169221 A1 * | 8/2006 | Teague | A01K 13/006 | 119/850 |
| 2010/0223943 A1 * | 9/2010 | Loukaides | A41D 13/0053 | 62/259.3 |
| 2010/0319381 A1 * | 12/2010 | Hubler | A41D 13/0053 | 62/259.3 |
| 2012/0305215 A1 * | 12/2012 | Kearns | F28D 15/00 | 165/56 |
| 2015/0233621 A1 | 8/2015 | Gregory | | |
| 2016/0007773 A1 | 1/2016 | Renshaw | | |
| 2018/0249738 A1 * | 9/2018 | Cantrell | A23L 3/36 | |

\* cited by examiner

REFRIGERATED BLANKET FOR COLD PRODUCT TRANSPORT

RELATED APPLICATION

This application claims priority to U.S. Provisional Application No. 62/465,499 filed on Mar. 1, 2017, the content of which is hereby incorporated by reference in its entirety.

BACKGROUND

Certain products, such as ice cream and meat, need to stay cold from production to consumption. This is known as the cold chain. A problem for a product distributor is economically maintaining the cold chain. Traditionally this has been done by refrigerating units used in product transport, or through passive cooling and insulation technology, such as Styrofoam and dry ice.

SUMMARY

In one embodiment, a flexible cooling blanket is provided. The flexible cooling blanket includes a cooling layer assembly having a first fabric sheet and a second fabric sheet operatively coupled to the first fabric sheet along a first folding seam. The cooling layer assembly also includes a first set of rigid cooling coils disposed between the first and second fabric sheets on a first side of the first folding seam and a second set of rigid cooling coils disposed between the first and second fabric sheets on a second side of the first folding seam. A first flexible tube is connected to the first set of rigid cooling coils and the second set of rigid cooling coils, and the first flexible tube extends across the first folding seam from the first side of the first folding seam to the second side of the first folding seam. The flexible cooling blanket also includes a heat dissipating layer assembly having a third fabric sheet and a fourth fabric sheet operatively coupled to the third fabric sheet along a second folding seam. The heat dissipating layer assembly also includes a first set of rigid heat dissipating coils disposed between the third and fourth fabric sheets on a first side of the second folding seam and a second set of rigid heat dissipating coils disposed between the third and fourth fabric sheets on a second side of the second folding seam. A second flexible tube is connected to the first set of rigid heat dissipating coils and the second set of rigid heat dissipating coils, and the second flexible tube extends across the second folding seam from the first side of the second folding seam to the second side of the second folding seam. The cooling layer assembly and the heat dissipating layer assembly are operatively connected, and the second fabric sheet of the cooling layer assembly is disposed adjacent to the third fabric sheet of the heat dissipating layer assembly. A compressor is operatively connected to the cooling layer assembly.

In another embodiment, a method for assembling a flexible cooling blanket is provided. The method includes forming a cooling layer assembly by operatively coupling a first fabric sheet and a second fabric sheet along a first folding seam. The method also includes disposing a first set of rigid cooling coils between the first and second fabric sheets on a first side of the first folding seam, and disposing a second set of rigid cooling coils between the first and second fabric sheets on a second side of the first folding seam. The first set of rigid cooling coils and the second set of rigid cooling coils are connected using a first flexible tube, where the first flexible tube extends across the first folding seam from the first side of the first folding seam to the second side of the first folding seam. The method includes forming a heat dissipating layer assembly by operatively coupling a third fabric sheet and a fourth fabric sheet along a second folding seam. The method also includes disposing a first set of heat dissipating coils between the third and fourth fabric sheets on a first side of the second folding seam, and disposing a second set of heat dissipating coils between the third and fourth fabric sheets on a second side of the second folding seam. The first set of heat dissipating coils and the second set of rigid heat dissipating coils are connected using a second flexible tube, where the second flexible tube extends across the second folding seam from the first side of the second folding seam to the second side of the second folding seam. The cooling layer assembly is operatively connected to the heat dissipating layer assembly. The second fabric sheet of the cooling layer assembly is disposed adjacent to the third fabric sheet of the heat dissipating layer assembly. A compressor is operatively connected to the cooling layer assembly.

In another embodiment, a method for using a flexible cooling blanket for cooling items in a delivery vehicle is provided. The method includes forming a cooling layer assembly by operatively coupling a first fabric sheet and a second fabric sheet along a first folding seam. The method also includes disposing a first set of rigid cooling coils between the first and second fabric sheets on a first side of the first folding seam, and disposing a second set of rigid cooling coils between the first and second fabric sheets on a second side of the first folding seam. The first set of rigid cooling coils and the second set of rigid cooling coils are connected using a first flexible tube, where the first flexible tube extends across the first folding seam from the first side of the first folding seam to the second side of the first folding seam. The method includes forming a heat dissipating layer assembly by operatively coupling a third fabric sheet and a fourth fabric sheet along a second folding seam. The method also includes disposing a first set of heat dissipating coils between the third and fourth fabric sheets on a first side of the second folding seam, and disposing a second set of heat dissipating coils between the third and fourth fabric sheets on a second side of the second folding seam. The first set of heat dissipating coils and the second set of rigid heat dissipating coils are connected using a second flexible tube, where the second flexible tube extends across the second folding seam from the first side of the second folding seam to the second side of the second folding seam. The cooling layer assembly is operatively connected to the heat dissipating layer assembly. The second fabric sheet of the cooling layer assembly is disposed adjacent to the third fabric sheet of the heat dissipating layer assembly. The method also includes disposing the first fabric sheet of the cooling layer assembly on top of the items in the delivery truck for cooling the items.

BRIEF DESCRIPTION OF THE DRAWINGS

The accompanying figures, which are incorporated in and constitute a part of this specification, illustrate one or more embodiments of the present disclosure and, together with the description, help to explain the present disclosure. The embodiments are illustrated by way of example and should not be construed to limit the present disclosure. In the figures.

DETAILED DESCRIPTION

Figure 1:
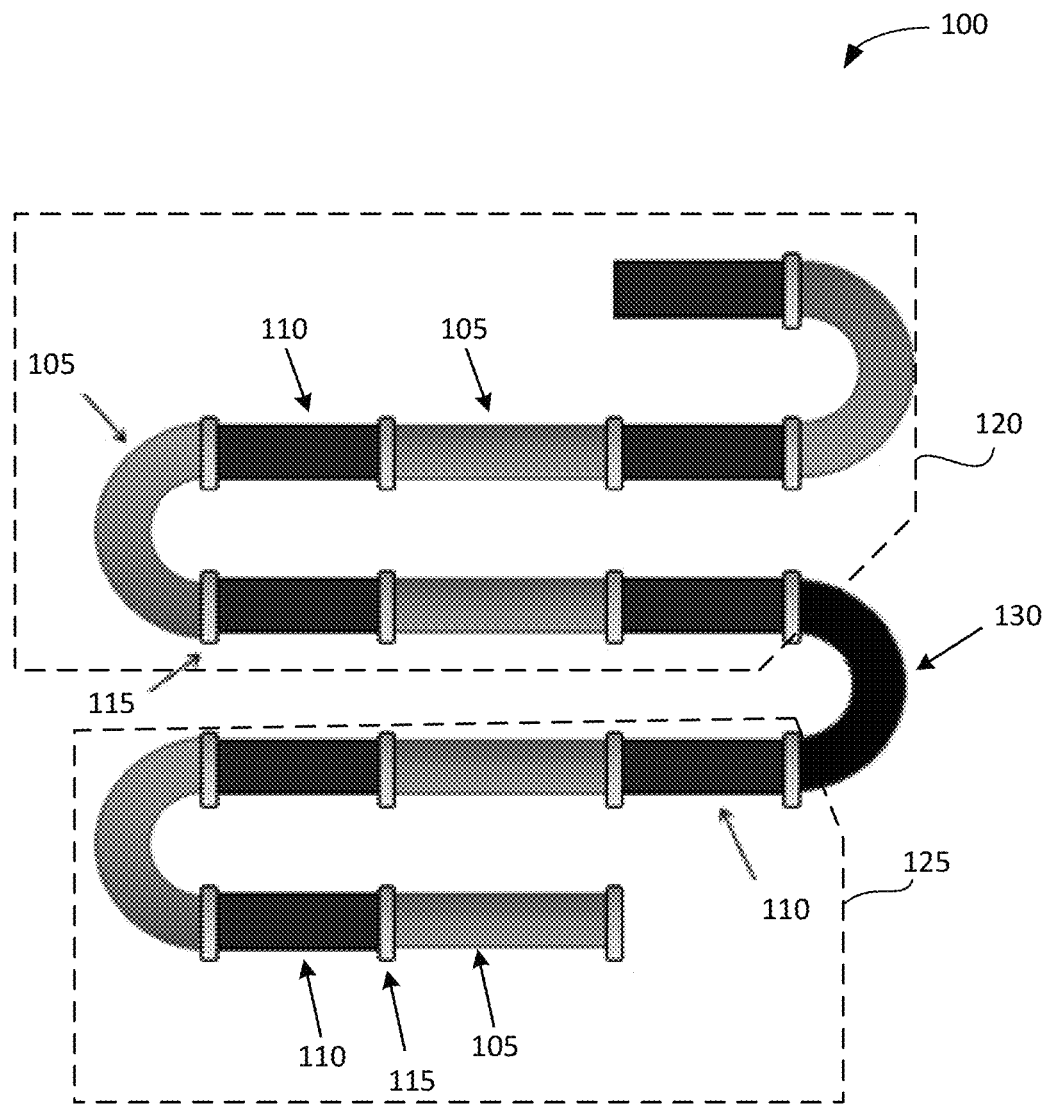
FIG. 1 is a schematic of an exemplary set of coils for use in a flexible cooling blanket, according to an example embodiment.

Certain products, such as ice cream and meat, need to stay cold from production to consumption. This is known as the cold chain. A problem for a product distributor is economically maintaining the cold chain. Traditionally this has been done by refrigerating units used in product transport, or through passive cooling and insulation technology, such as Styrofoam and dry ice. Each of these has drawbacks, however. For example, a refrigerated truck or even a refrigerated compartment inside a truck cools a given area, no matter whether it carries a full load within that area. Styrofoam and dry ice does not cool uniformly, can damage product, and can be dangerous for customers. Moreover alternative delivery methods, such as using an Uber-style citizen for delivery may require the use of vehicles that will not be equipped with refrigerators or refrigerated compartments.

Exemplary embodiments provide a unitary flexible cooling blanket that includes a compartmentalized cooling layer assembly and a compartmentalized heat dissipating layer assembly that are disposed adjacent to each other. Each layer assembly includes a fabric sleeve where a set of rigid coils are disposed. The set of rigid coils are connected to another set of rigid coils disposed within the sleeve using a flexible tube. The flexible tube extends across a folding seam in the sleeve, which allows the flexible cooling blanket to fold at the folding seams.

The cooling blanket described herein, uses refrigeration technology within a flexible shell, and includes high-pressure hoses and a compressor. The flexible cooling blanket combines flexible hoses with rigid metal tubing, such as copper or aluminum suitable for heat transfer. In an example embodiment, the flexible cooling blanket is appropriately sized for the class of vehicle that may use it. For example, a larger flexible cooling blanket for a truck, and a smaller flexible cooling blanket for the trunk of a car.

The flexible cooling blanket can be loosely placed on top of and/or around products that need to be cooled. Placing the flexible cooling blanket on top of products helps minimize the space that is refrigerated, and leaves little unoccupied air between the products and the flexible cooling blanket, even as other items are unloaded. In an example embodiment, the flexible cooling blanket comprises of looser draped fabric, which can be draped onto the floor or bottom surface of the vehicle to seal air inside at the blanket and reduce the amount of escaping cool air. In some embodiments, the flexible cooling blanket can be used as a cooling or warming mat, and products can be placed on the blanket. In some embodiments, the flexible cooling blanket can be used to segment or divide a space or volume to create a cool side for receiving products that require cooling and a warm side for products that require warming.

The flexible cooling blanket, in an example embodiment, includes a compressor and internal coils running a coolant. The internal coils include metal parts and flexible hoses attached to each other using high-pressure couplings. The coils are sewn into a durable fabric, such as nylon, for some padding between the coils and the cooled products. The backside of the coils may be insulated from the outside, for example using nano-insulates such as diatomite that may be sown into the blanket. The heat dissipating layer assembly dissipates heat, which may be minimal, into ambient air.

In an example embodiment, the flexible cooling blanket may plug into an outlet provided in the vehicle and powered by electricity from the vehicle's engine alternator or a separate power pack. A blanket for a car or SUV may be plugged into a small-vehicle outlet, such as the standard 12 V receptacle.

In an example embodiment, the flexible cooling blanket includes re-sealable sleeves that allow access to the coils disposed within. The coils may be removably connected to one or more other coils, and a user may be able to unfasten the connectors to remove the coils from the cooling blanket's sleeves. In an example embodiment, the sleeves of the flexible cooling blanket, without the coils, may be used for passive cooling. Alternatively, the sleeves of the flexible cooling blanket, without the coils, may be used as insulation material.

FIG. 1 is a schematic of an exemplary set of coils 100 for use in a flexible cooling blanket, according to an example embodiment. The set of coils 100 may be disposed within a sleeve formed from at least two fabric sheets. In an example embodiment, the set of coils 100 includes rigid tubing members or rigid coils. In another embodiment, the set of coils 100 includes flexible tubing members or flexible coils. In yet another embodiment, the set of coils 100 includes a combination of rigid tubing members or coils and flexible tubing members or coils. The rigid tubing members or coils and the flexible tubing members or coils may be connected in an alternating manner.

The exemplary set of coils 100 include one or more rigid hollow cylinders or rigid coils 105. The rigid coils 105 may comprise of heat conductive metal such as copper or aluminum. In an example embodiment, the set of coils 100 also includes one or more high-pressure flexible hoses 110. The rigid coil 105 and the high-pressure flexible hose 110 may be connected to one another via a connector 115. As shown in FIG. 1, the rigid coils 105 and the high-pressure flexible hoses 110 may be connected to each other in an alternating manner. The high-pressure flexible hoses 110 may be similar to hoses used in the medical field or scuba diving equipment. In an example embodiment, the coils 100 include a first set of coils 120 and a second set of coils 125 that are connected to each other using a flexible tube 130.

The unitary flexible cooling blanket described herein includes a compartmentalized cooling layer assembly and a compartmentalized heat dissipating assembly. The cooling layer assembly includes a first set of cooling coils, for example the first set of coils 120, and a second set of cooling coils, for example the second set of coils 125, disposed between a first fabric sheet and a second fabric sheet that are operatively connected to form a sleeve. The set of coils disposed within the sleeve of the cooling layer assembly may be the set of coils 100 illustrated in FIG. 1.

The heat dissipating layer assembly includes a first set of heat dissipating coils, for example the first set of coils 120, and a second set of heat dissipating coils, for example the second set of coils 125, disposed between a third fabric sheet and a fourth fabric sheet that are operatively connected to form a sleeve. The set of coils disposed within the sleeve of the heat dissipating layer assembly may be the set of coils 100 illustrated in FIG. 1.

Figure 2:
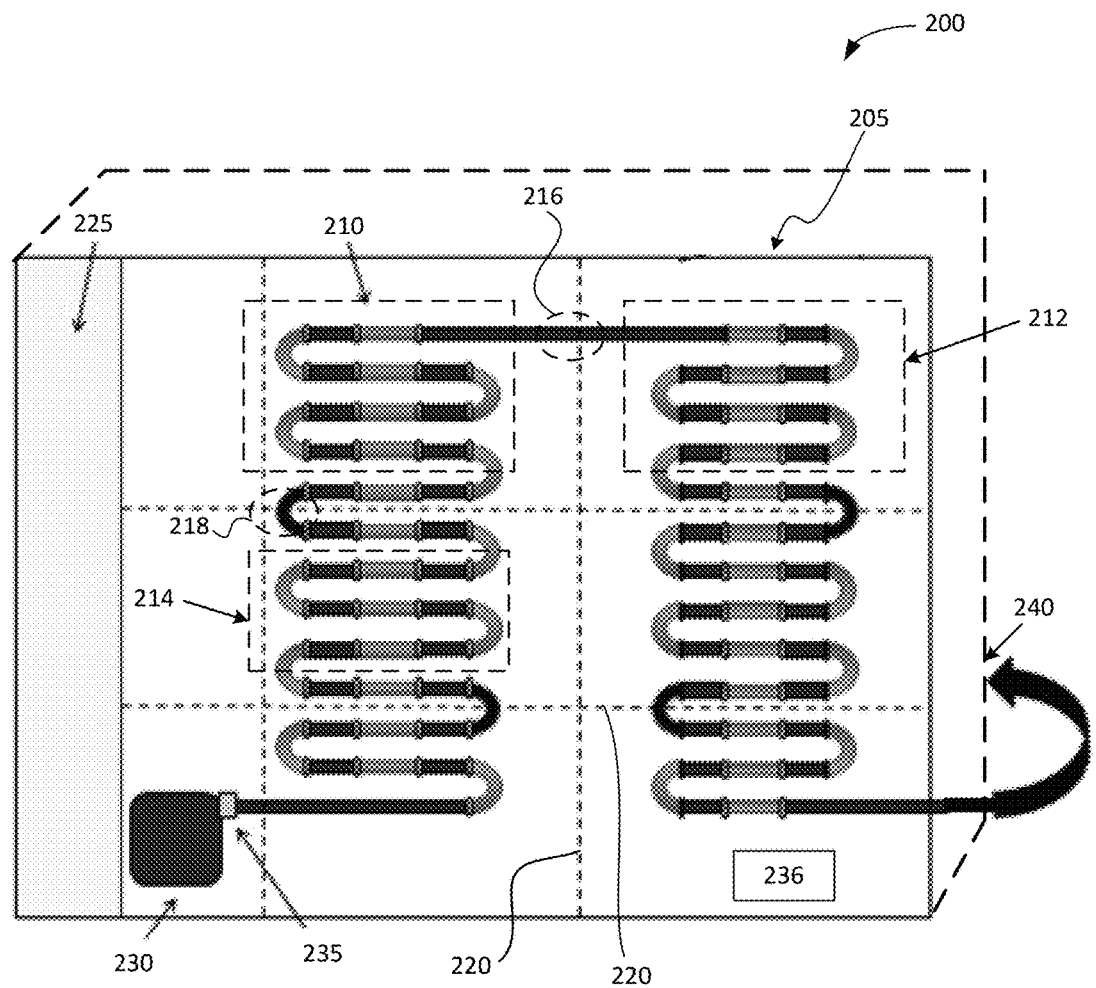
FIG. 2 is a schematic of an exemplary cooling layer assembly for use in the flexible cooling blanket, according to an example embodiment.

FIG. 2 is a schematic diagram of an exemplary flexible cooling blanket 200, according to an example embodiment. The flexible cooling blanket is a unitary blanket that includes a cooling layer assembly in sleeve 205 and a heat dissipating layer assembly 240 adjacent to the cooling layer assembly. The cooling layer assembly includes sleeve 205 formed by joining two fabric sheets. The cooling layer assembly includes multiple sets of rigid coils disposed within the sleeve 205, for example, a first set of coils 210, a second set of coils 212 and a third set of coils 214. Each set of coils is connected to another set of coils using a flexible tube. For example, rigid coils 210 are connected to rigid coils 212 via flexible tube 216, and rigid coils 210 and rigid coils 214 are connected via flexible tube 218.

The sleeve includes folding seams 220. The flexible tube 216 and 218 extend across the folding seams 220, as shown in FIG. 2. The coils are operatively connected to a compressor 230 and a regulator 235.

In an example embodiment, the flexible cooling blanket includes a temperature sensor 236. The compressor 230 may automatically turn-on or turn-off based on a sensed temperature.

The cooling layer assembly 205 is operatively connected to the heat dissipating layer assembly 240. In an example embodiment, the cooling layer assembly 205 and the heat dissipating layer assembly 240 may be connected using a flexible tube. The heat dissipating layer 240 may be made of the same components as the cooling layer assembly 205. The heat dissipating layer assembly 240 may include a similar set of rigid coils that are connected to one another via flexible tubes as the cooling layer assembly 205. As shown, the heat dissipating layer 240 may be disposed adjacent to the cooling layer assembly 205 as illustrated in FIG. 2.

In an example embodiment, the flexible cooling blanket 200 is connected to compressor 230 and regulator 235 via a flexible tube. The compressor 230 may pump a suitable coolant through the coils in the cooling layer assembly. Suitable coolants may include a gaseous coolant or a liquid coolant. Exemplary coolants include, but are not limited to, PCC-10, CFC-11, CFC-12, H-12B1, H-12B2, CFC-13, H-13B1, PFC-14, HCC-20, HCFC-21, HCFC-22, H-22B1, HFC-23, HCC-30, HCFC-31, HFC-32, HCC-40, HFC-41, HC-50, PCC-110, CFC-111, CFC-112, CFC-112a, CFC-113a, CFC-114, CFC-114a, H-114B2, CFC-115, PFC-116, HCC-120, HCFC-121, HCFC-112a, HCFC-122, HCFC-112a, HCFC-122b, HCFC-123, HCFC-123a, HCFC-123b, HCFC-124, HCFC-124a, HFC-125, HFC-E125, HCC-130, HCC-130a, HCFC-131, HCFC-131a, HCFC-131b, HCFC-132, HCFC-132a, HCFC-132b, HCFC-132C, H-132bB2, HCFC-133, HCFC-133a, HCFC-133b, HFC-134, HFC-134a, HFC-E134, HCC-140, HCC-140a, HCFC-141, H-141B2, HCFC-141a, HCFC-141b, HCFC-142, HCFC-142a, HCFC-142b, HFC-143, HFC-143a, HFC-143m, HFC-E143a, HCC-150, HCC-150a, HCFC-151, HCFC-155a, HFC-152, HFC-152a, HCC-160, HFC-161, HC-170, HC-E170, CFC-211, CFC-212, CFC-213, CFC-214, CFC-215, CFC-216, CFC-216ca, CFC-217, CFC-217b, PFC-218, HCFC-221, HCFC-222c, HCFC-223, HCFC-223ca, HCFC-223cb, HCFC-224, HCFC-224ca, HCFC-224cb, HCFC-225, HCFC-225aa, HCFC-225ba, HCFC-255bb, HCFC-225cb, HCFC-225cc, HCFC-225da, HCFC-225ea, HCFC-225eb, HCFC-226, HCFC-226ba, HCFC-226ca, HCFC-226cb, HCFC-226da, HCFC-226ea, HFC-227ca, HFC-227ca2, HFC-227ea, HFC-227me, HCFC-231, HCFC-232, HCFC-232cb, HCFC-233, HCFC-233ca, HCFC-233cb, HCFC-233cc, HCFC-234, HCFC-234aa, HCFC-234ab, HCFC-234ba, HCFC-234bb, HCFC234bc, HCFC234ca, HCFC-234ca, HCFC-234cb, HCFC-234cc, HCFC-234cd, HCFC-234da, HCFC-234fa, HCFC-234fb, HCFC-235, HCFC-235ca, HCFC-235cb, HCFC-235cc, HCFC-235da, HCFC-235fa, HFC-236cb, HFC-236ea, HFC-236fa, HFC-263me, HFC-FE-36, HCFC-241, HCFC-242, HCFC-243, HCFC-243ca, HCFC-243cb, HCFC-243cc, HCFC-243da, HCFC-243ea, HCFC-243ec, HCFC-244, HCFC-244ba, HCFC-244bb, HCFC-244ca, HCFC-244cb, HCFC-244cc, HCFC-244da, HCFC-244db, HCFC-244ea, HCFC-244eb, HCFC-244ec, HCFC-244fa, HCFC-244fb, HFC-245ca, HFC-245cb, HFC-245ea, HFC-245eb, HFC-245fa, HFC-245mc, HFC-245mf, HFC-245qc, HCFC-251, HCFC-252, HCFC-252ca, HCFC-255cb, HCFC-252dc, HCFC-255ec, HCFC-253, HCFC-253ba, HCFC-253bb, HCFC-253ca, HCFC-253cb, HCFC-253ea, HCFC-253eb, HCFC-253ec, HCFC-253fa, HCFC-253fb, HCFC-253fc, HFC-254cb, HFC-254pc, HCFC-261, HCFC-261ba, HCFC-262, HCFC-262ca, HCFC-262fa, HCFC-262fb, HFC-263, HCFC-271, HCFC-271b, HCFC-271d, HCFC-271fb, HFC-272, HFC-281, HC-290, CFC-C316, CFC-C317, PFC-C318, PFC-3-1-10, HCFC-329ccd, HFC-338eea, HFC-347-ccd, HFC-347mcc, hfc-347mmy, HFC-365mfc, PFC-4-1-12, PFC-5-1-14, CFC-400, HCFC-401A, HCFC-401B, HCFC-401C, HCFC-402A, HCFC-402B, HCFC-403A, HCFC-403B, HFC-404A, HCFC-405A, HCFC-406A, HCFC-406B, HFC-407A, HFC-407, HFC-407C, HFC-407D, HFC-407E, HFC-407F, HCFC-408A, HCFC-409A, HCFC-409B, HFC-410A, HFC-410B, HCFO-411A, HCFO-411B, HCFO-411C, HCFC-412A, HFC-413A, HCFC-414A, HCFC-414B, HCFC-415A, HCFC-415B, HCFC-416, HFC-417A, HFC-417B, HCFC-418A, HFC-419A, HCFC-420A, HFC-421, HFC-421B, HFC-422A, HFC-422B, HFC-422C, HFC-422D, HFC-423A, HFC-424A, HFC-425A, HFC-426A, HFC-427A, HFC-428A, HFC-429A, HFC-430A, HFC-431A, HO-432A, HO-433A, HO-433B, HO-433C, HFC-434A, HFC-435A, HC-436A, HC-436B, HFC-437A, HFC-438A, HFC-439A, HFC-440A, HC-441A, HCFC-500, HCFC-501, CFC-502, HCFC-503, HCFC-504, HCFC-505, HCFC-506, HFC-507[A], HFC-508[A], HFC-508B, HCFC-509[A], HC-510[A], HC-511[A], HC-600, HC-600a, HC601, HC-601a, HC-610, HC-611, methylamine, ethylamine, hydrogen, helium, ammonia, water/steam, neon, nitrogen, air, oxygen, argon, carbon dioxide, argon, nitrous oxide, sulfur dioxide, krypton, CFO-1112a, CFO-1113, PFO-1114, HCO-1120, HCO-1130, HFO-1132a, HCO-1140, HFO-1141, HO-1150, PFO-1216, PFO-1218, HCFO-1233zd, HFO-1234yf, HFO-1234ze, HO-1270 or other coolants.

The compressor constricts the coolant vapor, raising its pressure, and pushes it into the coils in the heat dissipating layer assembly. When the hot gas in the coils meets the cooler air temperature of the flexible cooling blanket's surroundings, it becomes a liquid. In liquid form at high pressure, the coolant cools down as it flows into the coils inside the cooling layer assembly. The coolant absorbs the heat inside the cooling layer assembly, cooling down the air and the first fabric sheet surface. Then, the coolant evaporates to a gas, and flows back to the compressor, where the cooling cycle starts over.

The compressor is connected the flexible cooling blanket and powers the flexible cooling blanket. An example embodiment includes a fan cool the compressor, similar to a computing device fan. The fan may also be included for air circulation. In embodiments that do not include a fan for air circulation, the cool air from the flexible cooling blanket settles over the items that need to be cooled. The compressor keeps the coolant flowing and generates the high pressure that helps give the coolant its cooling properties.

As shown in FIG. 2, in an example embodiment, a portion 225 of the flexible cooling blanket 200 is devoid of coils or other components. This portion 225 of the blanket 200 can be draped onto the floor or bottom surface of a vehicle to close off gaps between the products that need to be cooled and the surrounding air. Closing off gaps using the portion 225 of the flexible cooling blanket stops cool air from escaping, and the cool air is retained around the products. Draping the portion 225 onto the floor or bottom surface of the vehicle also allows a user to completely surround the products that need to be cooled. In an example embodiment, another portion devoid of coils and other components is also provided around the perimeter of the flexible cooling blanket 200.

Figure 3:
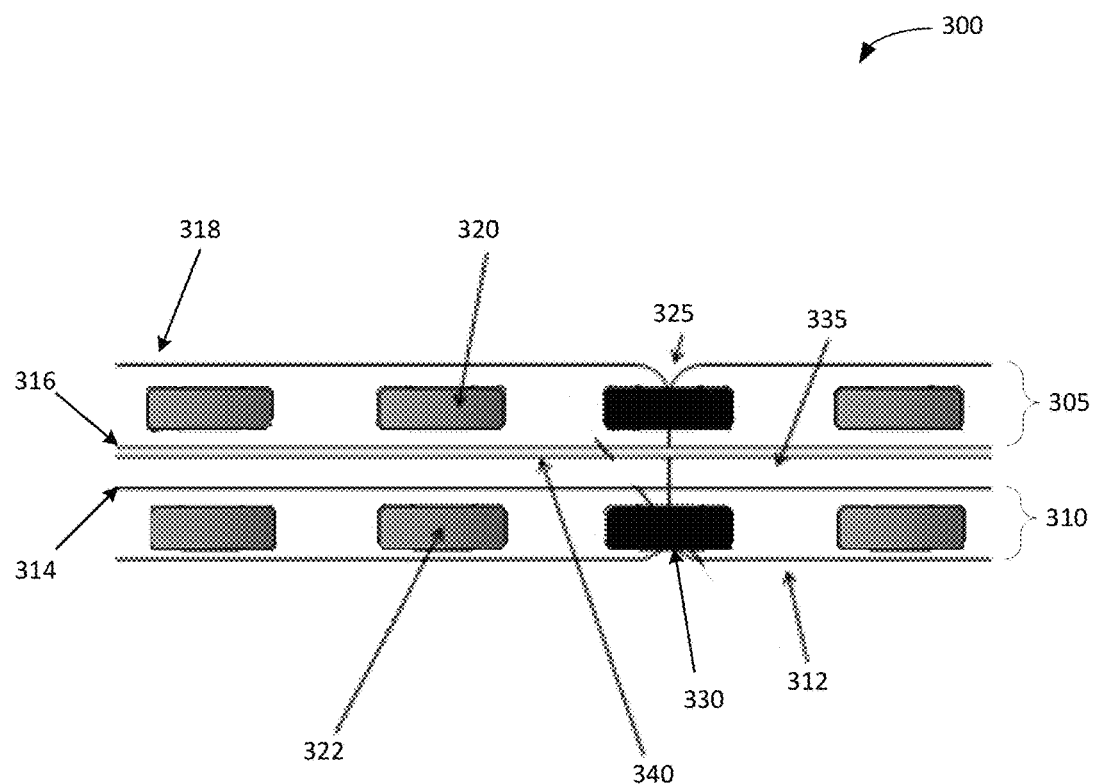
FIG. 3 is a cross-sectional view of an exemplary cooling layer assembly and exemplary heat dissipating layer assembly, according to an example embodiment.

FIG. 3 is a cross sectional view of a flexible cooling blanket 300 illustrating an exemplary cooling layer assembly 310 and exemplary heat dissipating layer assembly 305, according to an example embodiment. The flexible cooling blanket 300 is a unitary blanket including a compartmentalized cooling layer assembly and a compartmentalized heat dissipating layer assembly. The flexible cooling blanket 300 includes a first fabric sheet 312 and a second fabric sheet 314 as part of the cooling layer assembly 310. A set of cooling coils 322 is disposed between the first fabric sheet 312 and the second fabric sheet 314. At least one cooling coil is connected to another cooling coil via a flexible tube 330. As shown in FIG. 3, the flexible tube extends across a folding seam, for example folding seam 325, of the flexible cooling blanket 300.

The flexible cooling blanket 300 includes a third fabric sheet 316 and a fourth fabric sheet 318 as part of the heat dissipating layer assembly 305. A set of heat dissipating coils 320 are disposed between the third fabric sheet 316 and the fourth fabric sheet 318. The heat dissipating layer assembly 305 is disposed adjacent to the cooling layer assembly 310 as shown in FIG. 3. The second fabric sheet 314 of the cooling layer assembly 310 is disposed adjacent to the third fabric sheet 316 of the heat dissipating layer assembly 305. The fabric sheets 312, 314, 316, and 318 may be made of a durable fabric such as nylon or other fabric material.

In an example embodiment, a layer of thermal reflective material 340 is disposed adjacent to the third fabric sheet 316, or between the third fabric sheet 316 and the second fabric sheet 314. In an example embodiment, a layer of insulating material 335 is disposed adjacent to the second fabric sheet 314, or between the third fabric sheet 316 and the second fabric sheet 314. The insulating material in layer 335 may be a diatomite insulating material, a nano insulating material, or other insulating material.

As described above, in some embodiments the flexible cooling blanket is used to wrap the items to maintain a cold temperature of the items. In another exemplary embodiment, the flexible cooling blanket may be used as a mat, where it can be placed on the floor (e.g., vehicle floor) with the heat dissipating layer assembly touching the floor, and items are placed on the cooling layer assembly of the flexible cooling blanket. In this embodiment, the flexible cooling blanket pushes the heat down towards the floor and the cool air up towards the items on the blanket. Also, cold air is heavier so it rises towards the items. In some cases, a little extra cool air towards the items is sufficient to maintain satisfactory cold chain compliance (especially in cold weather) for product transport. Using the flexible cooling blanket as a mat also reduces wear and tear of the blanket since it will remain stationary on the floor. The flexible cooling blanket may be used as a mat in the trunk of a car. For embodiments in which the flexible cooling blanket is used as a mat, the flexible cooling blanket can be formed to have increased rigidity to restrict bending. For example, the flexible cooling blanket can include polymer reinforcing members or one or more polymer layers.

In another exemplary embodiment, the flexible cooling blanket may be used as a mat with the cooling layer assembly facing the floor and the heat dissipating layer assembly facing away from the floor. The items are placed on the heat dissipating layer assembly, and the flexible cooling blanket may be used as a heater to keep warm items warm. Such items may include freshly cooked items. In this embodiment, the blanket pushes the heat up toward the items, and moves the cool air away from the items. In another exemplary embodiment, the flexible cooling blanket may be used as a wall to divide chilled items, by placing as cold items or beverages on the cooling layer assembly side, and the warm items such as cooked food on the heat dissipating layer assembly side.

Figure 4:
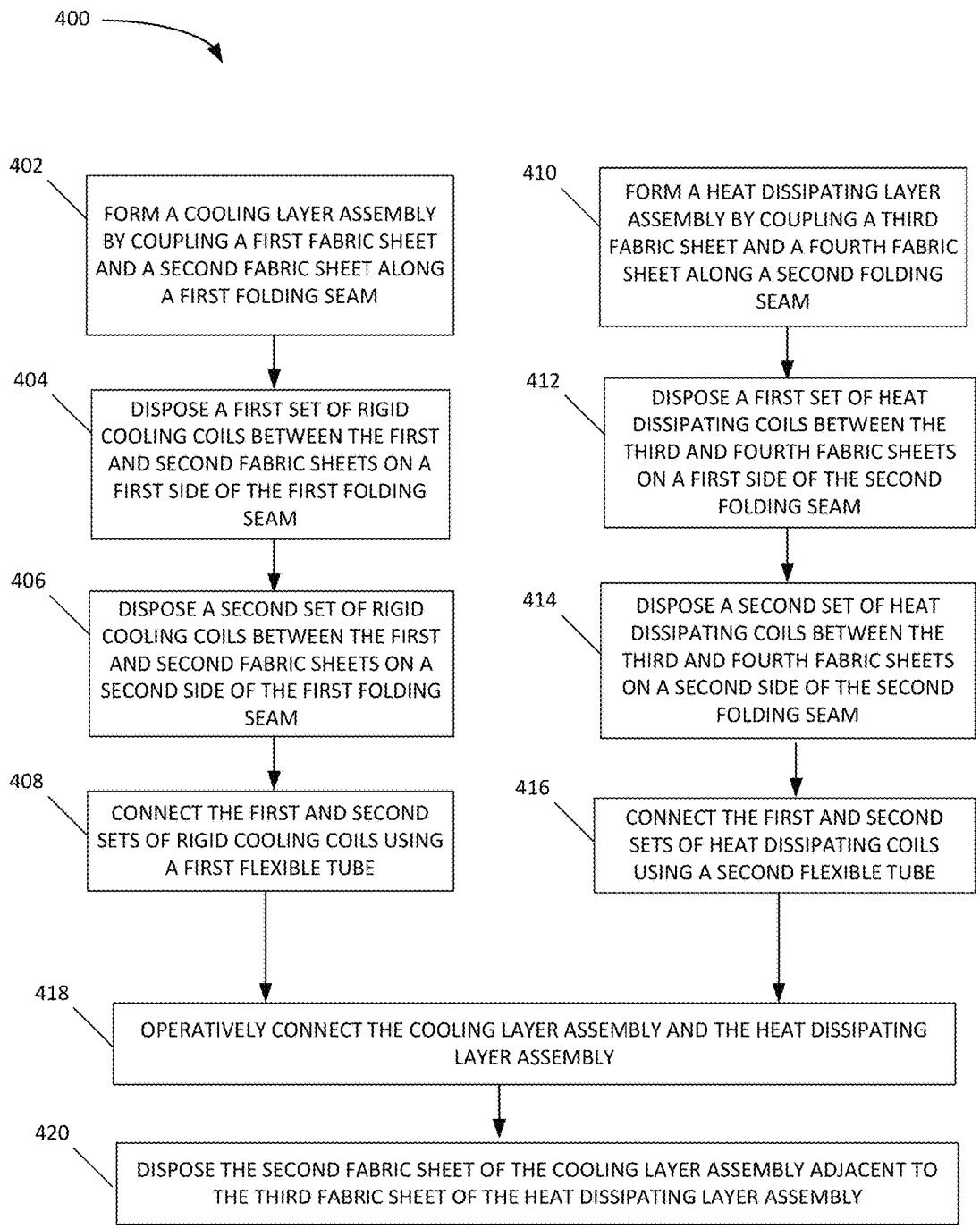
FIG. 4 is a flowchart illustrating an exemplary method for assembling a flexible cooling blanket, according to an example embodiment.

FIG. 4 is a flowchart illustrating an exemplary method 400 for assembling a flexible cooling blanket, according to an example embodiment. The flexible cooling blanket is a unitary blanket including a compartmentalized cooling layer assembly and a compartmentalized heat dissipating layer assembly. The method includes, at step 402, forming a cooling layer assembly by coupling a first fabric sheet and a second fabric sheet along a first folding seam. In an example embodiment, the first and second fabric sheets are resealably coupled to each other. The first fabric sheet and the second fabric sheet may be coupled at three sides of the sheet, and the fourth side of the sheets may be left open to allow the coils to be inserted in the sleeve. The fourth side of the sleeve of the cooling layer assembly may be sealed after step 404. The fourth side of the sheets may be releasably coupled.

At step 404, a first set of rigid cooling coils is disposed between the first and second fabric sheets on a first side of a first folding seam. At step 406, a second set of rigid cooling coils is disposed between the first and second fabric sheets on a second side of the first folding seam. In an example embodiment, the first set of rigid cooling coils and the second set of rigid cooling coils are removably disposed between the first fabric sheet and the second fabric sheet.

At step 408, the first set of rigid cooling coils and the second set of rigid cooling coils are connected using a first flexible tube, wherein the first flexible tube extends across the first folding seam from the first side of the first folding seam to the second side of the first folding seam.

The method also includes, at step 410, forming a heat dissipating layer assembly by coupling a third fabric sheet and a fourth fabric sheet along a second folding seam. In an example embodiment, the third and fourth fabric sheets are resealably coupled to each other. The third fabric sheet and the fourth fabric sheet may be coupled at three sides of the sheet, and the fourth side of the sheets may be left open to allow the coils to be inserted in the sleeve. The fourth side of the sleeve of the heat dissipating layer assembly may be sealed after step 412. The fourth side of the sheets may be releasably coupled.

At step 412, a first set of heat dissipating coils is disposed between the third and fourth fabric sheets on a first side of the second folding seam. At step 414, a second set of heat dissipating coils is disposed between the third and fourth fabric sheets on a second side of the second folding seam. In an example embodiment, the first set of heat dissipating coils and the second set of heat dissipating coils are removably disposed between the third fabric sheet and the fourth fabric sheet.

At step 416, the first set of heat dissipating coils and the second set of rigid heat dissipating coils are connected using a second flexible tube, wherein the second flexible tube extends across the second folding seam from the first side of the second folding seam to the second side of the second folding seam.

As illustrated in FIG. 4, steps 402, 404, 406, and 408 may be performed in parallel with or after steps 410, 412, 414, and 416.

The method further includes, at step 418, operatively connecting the cooling layer assembly and the heat dissipating layer assembly. At step 420, the second fabric sheet of the cooling layer assembly is disposed adjacent to the third fabric sheet of the heat dissipating layer assembly. In an example embodiment, the method also includes disposing an insulating material between the second fabric sheet of the cooling layer assembly and the third fabric sheet of the heat dissipating layer assembly. In a further embodiment, the method includes disposing a thermal reflective material between the second fabric of the cooling layer assembly and the third fabric sheet of the heat dissipating layer assembly.

In an example embodiment, a compressor is operatively connected to the cooling layer assembly and the heat dissipating layer. The compressor may be disposed between the first and second fabric sheets or the third and fourth fabric sheets. In alternative embodiments, the compressor may be disposed outside of the flexible cooling blanket.

Figure 5:
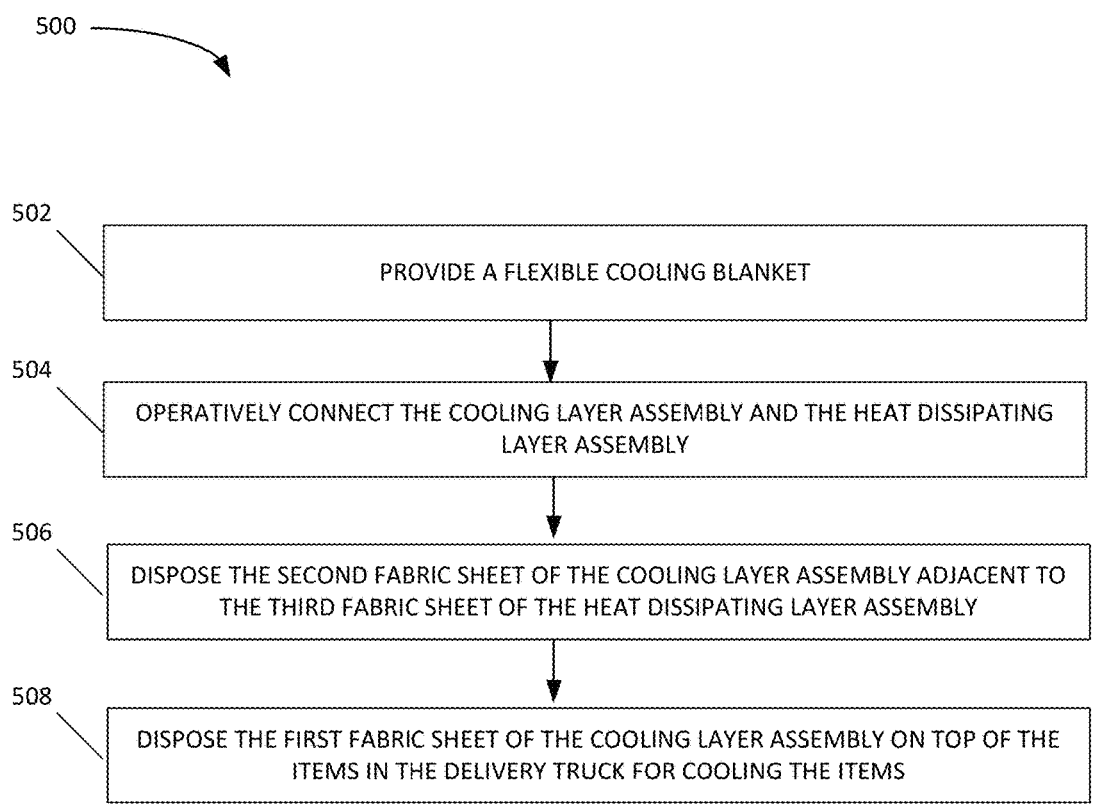
FIG. 5 is a flowchart illustrating an exemplary method for using a flexible cooling blanket for cooling items in a delivery vehicle, according to an example embodiment.

FIG. 5 is a flowchart illustrating an exemplary method 500 for using a flexible cooling blanket for cooling items in a delivery vehicle, according to an example embodiment. The method includes, at step 502, providing a flexible cooling blanket as described herein. For example, the flexible cooling blanket may be assembled according to method 400 of FIG. 4. The flexible cooling blanket may include components described with respect to FIGS. 1-3. The flexible cooling blanket is a unitary blanket including a compartmentalized cooling layer assembly and a compartmentalized heat dissipating layer assembly.

The method 500 includes, at step 504, operatively connecting the cooling layer assembly and the heat dissipating layer assembly. In some embodiments, the cooling layer assembly and the heat dissipating layer assembly are pre-coupled prior to providing the flexible cooling blanket to a user. In some embodiments, the cooling layer assembly and the heat dissipating layer assembly are provided to the user uncoupled, and the user operatively couples the cooling layer assembly and the heat dissipating layer assembly prior to use for cooling items.

At step 506, the second fabric sheet of the cooling layer assembly is disposed adjacent to the third fabric sheet of the heat dissipating layer assembly. In an example embodiment, the method also includes disposing an insulating material between the second fabric sheet of the cooling layer assembly and the third fabric sheet of the heat dissipating layer assembly. In a further embodiment, the method includes disposing a thermal reflective material between the second fabric of the cooling layer assembly and the third fabric sheet of the heat dissipating layer assembly.

In some embodiments, the flexible cooling blanket is provided pre-assembled by disposing the second fabric sheet of the cooling layer assembly adjacent to the third fabric of the heat dissipating layer assembly. In some embodiments, the flexible cooling blanket is provided unassembled, and the user disposes the second fabric sheet of the cooling layer assembly adjacent to the third fabric of the heat dissipating layer assembly.

In an example embodiment, a compressor is operatively connected to the cooling layer assembly and the heat dissipating layer. The compressor may be disposed between the first and second fabric sheets or the third and fourth fabric sheets. In alternative embodiments, the compressor may be disposed outside of the flexible cooling blanket. In a further embodiment, the method also includes electrically coupling the compressor to an electrical outlet in the delivery vehicle.

At step 508, the first fabric sheet of the cooling layer assembly is disposed on top of the items in the delivery truck for cooling the items. In an example embodiment, a portion of a space between the first and second fabric sheets of the cooling layer assembly is devoid of cooling coils. In a further embodiment, the method also includes disposing the portion of the space between the first and second fabrics devoid of cooling coils on a side surface of the items in the delivery truck to substantially cover the items. In another embodiment, the portion of the space between the first and second fabrics devoid of cooling coils is disposed on the floor or bottom surface of the delivery truck to close off gaps.

Figure 6:
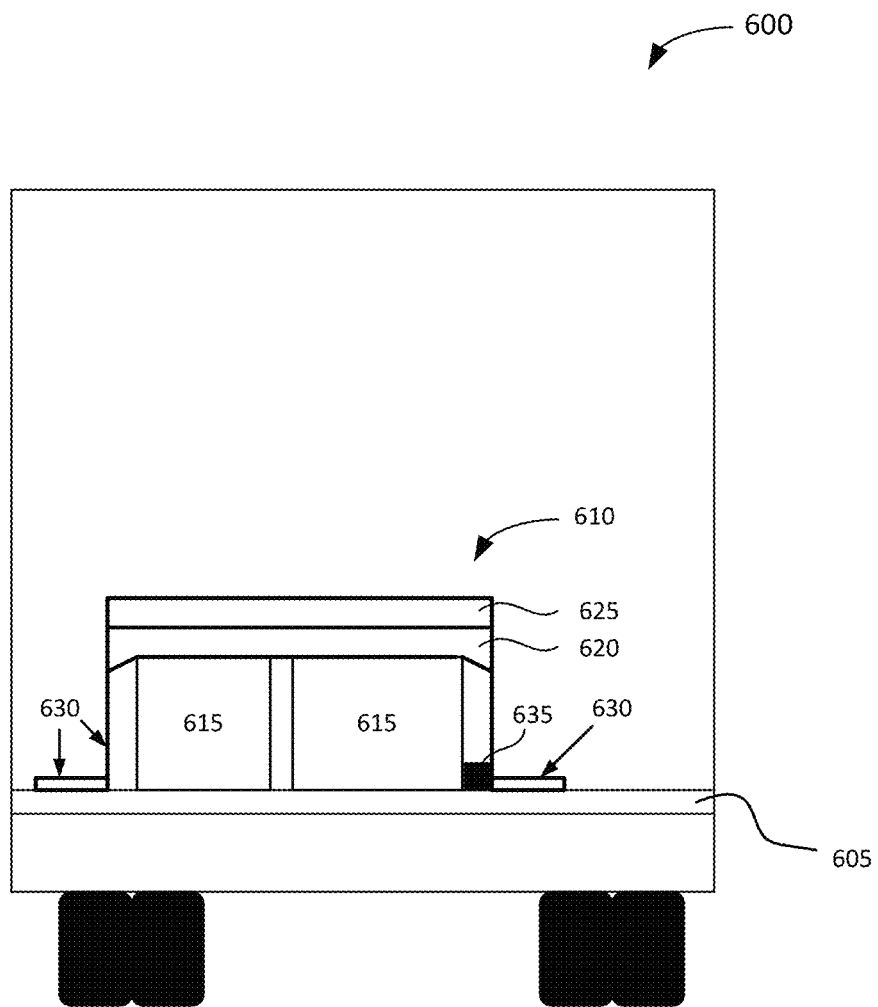
FIG. 6 illustrates an exemplary use of the flexible cooling blanket, according to an example embodiment.

FIG. 6 illustrates an exemplary use of the flexible cooling blanket 610 for cooling items in a delivery vehicle 600, according to an example embodiment. As shown in FIG. 6, the flexible cooling blanket 610 can be placed upon items 615 for cooling the items. As described above, the flexible cooling blanket 610 includes a cooling layer assembly 620 and a heat dissipating layer assembly 625. The cooling layer assembly 620 is placed on top of the items 615. The flexible cooling blanket 610 also includes a compressor 635.

The flexible blanket 610 surrounds the items 615. As described above, the flexible cooling blanket 610 includes a portion 630 devoid of coils or other components. As shown in FIG. 6, the portion 630 is draped onto the floor or bottom surface of the vehicle 610 to close off gaps and prevent cool air from escaping away from the items. The draping of the portion 630 makes the flexible cooling blanket 610 more efficient in cooling items 615. The portion 630 may also be disposed along a side surface of the items 615.

In some embodiments, the vehicle 610 has an insulated or refrigerated floor 605. Insulation may be added to the vehicle 610 on the floor 605, such as metal or ceramic for durability on a comb sandwich filled with an insulator. Alternatively, the floor 605 may be refrigerated using the same systems used to keep ice skating rinks cold even when outside temperatures are warm.

The flexible cooling blanket may be a primary cooling tool or a supportive tool, for example, to keep packages using other passive cooling technologies cooler longer.

The flexible cooling blanket described herein can efficiently cool items by surrounding the items, compared to a refrigeration unit that may not be full of items and spends energy cooling empty air in the unit. The flexible cooling blanket can respond to settings so the compressor turns on and off as required to keep the environment just cool enough to maintain cold chain requirements for transporting products. The flexible cooling blanket can easily conform to packing requirements, for example, by allowing delivery personnel to put cold items on one side of a truck or a car trunk, and other items on another side.

The coils combine flexible tubing with temperature conductive metals such as copper or aluminum to provide the structure required for a coolant system to work, but also provides flexibility of a blanket instead of forming a rigid shell. The flexible cooling blanket may use a nano-insulator, such as Diatomite, because the nano-insulator is thinner and more flexible than other insulating materials. The flexible cooling blanket may also be used as an insulating blanket when it is not powered. The sleeves that otherwise hold the coils may be filled with an insulating material instead so the flexible cooling blanket can be used as an insulating blanket. A thin reflective layer included in the flexible cooling blanket may reflect heat away and reduce air flow between the seams of the blanket.

The following description is presented to enable a person skilled in the art to create and use a flexible cooling blanket for cooling items. Various modifications to the example embodiments will be readily apparent to those skilled in the art, and the generic principles defined herein may be applied to other embodiments and applications without departing from the spirit and scope of the present disclosure. Moreover, in the following description, numerous details are set forth for the purpose of explanation. However, one of ordinary skill in the art will realize that the embodiments may be practiced without the use of these specific details. In other instances, well-known structures and processes are shown in block diagram form in order not to obscure the description of embodiments with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps can be replaced with a single element, component or step. Likewise, a single element, component or step can be replaced with multiple elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

What is claimed is:

1. A flexible cooling blanket comprising:
   a cooling layer assembly comprising:
      a first fabric sheet;
      a second fabric sheet, the second fabric sheet being operatively coupled to the first fabric sheet along a first folding seam;
      a first set of rigid cooling coils disposed between the first and second fabric sheets on a first side of the first folding seam;
      a second set of rigid cooling coils disposed between the first and second fabric sheets on a second side of the first folding seam; and
      a first flexible tube connecting the first set of rigid cooling coils and the second set of rigid cooling coils, the first flexible tube extending across the first folding seam from the first side of the first folding seam to the second side of the first folding seam;
   a heat dissipating layer assembly comprising:
      a third fabric sheet;
      a fourth fabric sheet, the fourth fabric sheeting being operatively coupled to the third fabric sheet along a second folding seam;
      a first set of rigid heat dissipating coils disposed between the third and fourth fabric sheets on a first side of the second folding seam;
      a second set of rigid heat dissipating coils disposed between the third and fourth fabric sheets on a second side of the second folding seam; and
      a second flexible tube connecting the first set of rigid heat dissipating coils and the second set of rigid heat dissipating coils, the second flexible tube extending across the second folding seam from the first side of the second folding seam to the second side of the second folding seam;
   wherein the cooling layer assembly and the heat dissipating layer assembly are operatively connected, and the second fabric sheet of the cooling layer assembly is disposed adjacent to the third fabric sheet of the heat dissipating layer assembly; and
   a compressor operatively connected to the cooling layer assembly.

2. The flexible cooling blanket of claim 1, wherein the first and second fabric sheets are resealably coupled to each other.

3. The flexible cooling blanket of claim 1, wherein the third and fourth fabric sheets are resealably coupled to each other.

4. The flexible cooling blanket of claim 1, wherein the first set of rigid cooling coils and the second set of rigid cooling coils are removably disposed between the first fabric sheet and the second fabric sheet.

5. The flexible cooling blanket of claim 1, further comprising an insulating material between the second fabric sheet of the cooling layer assembly and the third fabric sheet of the heat dissipating layer assembly.

6. The flexible cooling blanket of claim 1, further comprising a thermal reflective material between the second fabric sheet of the cooling layer assembly and the third fabric sheet of the heat dissipating layer assembly.

7. The flexible cooling blanket of claim 1, wherein the compressor is disposed between the first and second fabric sheets.

8. The flexible cooling blanket of claim 1, wherein the compressor is disposed outside a space formed between the first and second fabric.

9. The flexible cooling blanket of claim 1, wherein a portion of a space between the first and second fabric sheets of the cooling layer assembly is devoid of cooling coils or a portion of a space between third and fourth fabric sheets of the heat dissipating layer assembly is devoid of heat dissipating coils.

10. The flexible cooling blanket of claim 1, wherein at least one of the first set of rigid cooling coils or the second set of rigid cooling coils is connected to at least one of the first set of heat dissipating coils or the second set of heat dissipating coils by a third flexible tube.

11. The flexible cooling blanket of claim 1, wherein the second fabric sheet or the third fabric sheet is formed of a thermal insulating material.

12. A method for assembling a flexible cooling blanket, the method comprising:
- forming a cooling layer assembly by operatively coupling a first fabric sheet and a second fabric sheet along a first folding seam;
- disposing a first set of rigid cooling coils between the first and second fabric sheets on a first side of the first folding seam;
- disposing a second set of rigid cooling coils between the first and second fabric sheets on a second side of the first folding seam;
- connecting the first set of rigid cooling coils and the second set of rigid cooling coils using a first flexible tube, wherein the first flexible tube extends across the first folding seam from the first side of the first folding seam to the second side of the first folding seam;
- forming a heat dissipating layer assembly by operatively coupling a third fabric sheet and a fourth fabric sheet along a second folding seam;
- disposing a first set of heat dissipating coils between the third and fourth fabric sheets on a first side of the second folding seam;
- disposing a second set of heat dissipating coils between the third and fourth fabric sheets on a second side of the second folding seam;
- connecting the first set of heat dissipating coils and the second set of rigid heat dissipating coils using a second flexible tube, wherein the second flexible tube extends across the second folding seam from the first side of the second folding seam to the second side of the second folding seam;
- operatively connecting the cooling layer assembly and the heat dissipating layer assembly;
- disposing the second fabric sheet of the cooling layer assembly adjacent to the third fabric sheet of the heat dissipating layer assembly; and
- operatively connecting a compressor to the cooling layer assembly.

13. The method of claim 12, wherein the first and second fabric sheets are resealably coupled to each other.

14. The method of claim 12, wherein the third and fourth fabric sheets are resealably coupled to each other.

15. The method of claim 12, wherein the first set of rigid cooling coils and the second set of rigid cooling coils are removably disposed between the first fabric sheet and the second fabric sheet.

16. The method of claim 12, further comprising disposing an insulating material between the second fabric sheet of the cooling layer assembly and the third fabric sheet of the heat dissipating layer assembly.

17. The method of claim 12, further comprising disposing a thermal reflective material between the second fabric of the cooling layer assembly and the third fabric sheet of the heat dissipating layer assembly.

18. The method of claim 12, wherein the compressor is disposed between the first and second fabric sheets.

19. A method for using a flexible cooling blanket for cooling items in a delivery vehicle, the method comprising:
- forming a cooling layer assembly by operatively coupling a first fabric sheet and a second fabric sheet along a first folding seam;
- disposing a first set of rigid cooling coils between the first and second fabric sheets on a first side of the first folding seam;
- disposing a second set of rigid cooling coils between the first and second fabric sheets on a second side of the first folding seam;
- connecting the first set of rigid cooling coils and the second set of rigid cooling coils using a first flexible tube, wherein the first flexible tube extends across the first folding seam from the first side of the first folding seam to the second side of the first folding seam;
- forming a heat dissipating layer assembly by operatively coupling a third fabric sheet and a fourth fabric sheet along a second folding seam;
- disposing a first set of heat dissipating coils between the third and fourth fabric sheets on a first side of the second folding seam;
- disposing a second set of heat dissipating coils between the third and fourth fabric sheets on a second side of the second folding seam;
- connecting the first set of rigid heat dissipating coils and the second set of rigid heat dissipating coils using a second flexible tube, wherein the second flexible tube extends across the second folding seam from the first side of the second folding seam to the second side of the second folding seam;
- operatively connecting the cooling layer assembly and the heat dissipating layer assembly;
- disposing the second fabric sheet of the cooling layer assembly adjacent to the third fabric sheet of the heat dissipating layer assembly; and
- disposing the first fabric sheet of the cooling layer assembly on top of the items in the delivery truck for cooling the items.

20. The method of claim 19, wherein a portion of a space between the first and second fabric sheets of the cooling layer assembly is devoid of cooling coils, and the method further comprising disposing the portion of the space between the first and second fabrics devoid of cooling coils on a side surface of the items in the delivery vehicle to substantially cover the items.

21. The method of claim 19, further comprising:
- operatively connecting a compressor to the cooling layer assembly; and
- electrically coupling the compressor to an electrical outlet in the delivery vehicle.

* * * * *